(12) United States Patent
Shin

(10) Patent No.: US 7,167,868 B2
(45) Date of Patent: Jan. 23, 2007

(54) PARTITION-BASED HIGH DIMENSIONAL SIMILARITY JOIN METHOD

(75) Inventor: Hyoseop Shin, Seoul (KR)

(73) Assignees: Samsung Electronics Co., Ltd., Kyungi-do (KR); Paceco Corp., Hayward, CA (US)

( * ) Notice: Subject to any disclaimer, the term of this patent is extended or adjusted under 35 U.S.C. 154(b) by 512 days.

(21) Appl. No.: 10/639,597

(22) Filed: Aug. 13, 2003

(65) Prior Publication Data

US 2004/0093320 A1 May 13, 2004

(30) Foreign Application Priority Data

Sep. 11, 2002 (KR) ...................... 10-2002-0055101

(51) Int. Cl.
*G06F 17/00* (2006.01)
(52) U.S. Cl. .................. 707/101; 707/102; 707/104.1; 707/205
(58) Field of Classification Search ...................... None
See application file for complete search history.

(56) References Cited

U.S. PATENT DOCUMENTS 5,987,468 A * 11/1999 Singh et al. ................ 707/100

FOREIGN PATENT DOCUMENTS

JP 11-242688 A 9/1999

OTHER PUBLICATIONS

Kyuseok Shim, et al./ "High Dimensional Similarity Joins"/Proceedings of the 1997 IEEE International Conference on Data Engineering, 1997.
Christian Bohm, et al./ Epsilon Grid Order: An Algorithm for the Similarity Join on Massive High-Dimensional Data/ Proceedings of the 2001 ACM-SIGMOD Conference, 2001.

* cited by examiner

*Primary Examiner*—Jean M. Corrielus
*Assistant Examiner*—Isaac Woo
(74) *Attorney, Agent, or Firm*—Sughrue Mion, PLLC

(57) ABSTRACT

A partition-based high dimensional similarity join method allowing similarity to be efficiently measured by beforehand dynamically selecting space partitioning dimensions and the number of the partitioning dimensions using a dimension selection algorithm. A method of efficiently performing similarity join for high dimensional data during a relatively short period of time without requiring massive storage space. The method includes according to the present invention comprises the steps of partitioning a high dimensional data space and performing joins between predetermined data sets. Dimensions for use in partitioning the high dimensional data space and the number of partitioning dimensions are determined in advance before the space partitioning, and the joins are performed only when respective cells of the data sets are overlapping with each other or are neighboring each other.

8 Claims, 9 Drawing Sheets

FIG. 5

```
1   set number of partitions, np ← ⌈1/ε⌉;
2   initialize sampled data sets R_s, S_s;
3   initialize partition arrays, P_R[1...d][1...np], P_S[1...d][1...np] ← 0;
4   initialize number of distance computations, JoinCost[1...d] ← 0;
5
6   // compute the number of entities for each partition
7   for each entity <e_1,e_2,...,e_d> in R_s do
8       for each dimension i in [1...d] do
9           P_R [i][⌈np×e_i⌉]++ ;
10      end
11  end
12  for each entity <e_1,e_2,...,e_d> in S_s do
13      for each dimension i in [1...d] do
14          P_S [i][⌈np× e_i⌉]++ ;
15      end
16  end
17
18  for each dimension i in[1...d] do
19      for each partition number p in [1...np] do
20          if ( p>1 ) JoinCost[i] ← JoinCost[i] + P_R [i][p] × P_S [i][p-1];
21          JoinCost[i] ← JoinCost[i] + P_R [i][p] * P_S [i][p];
22          if ( i<np ) JoinCost[i] ← JoinCost[i]+ P_R [i][p] × P_S [i][p+1];
23      end
24  end
25
26  return the dimensions d for which JoinCost[d] is smaller.
```

PARTITION-BASED HIGH DIMENSIONAL SIMILARITY JOIN METHOD

The present Application claims priority from Korean Application No. 10-2002-0055101 filed Sep. 11, 2002, which is incorporated herein in full by reference.

BACKGROUND OF THE INVENTION

1. Field of the Invention

The present invention relates to a high dimensional similarity join method, and more particularly, to a partition-based high dimensional similarity join method for allowing similarity to be efficiently measured by beforehand dynamically selecting space partitioning dimensions and the number of the partitioning dimensions using a dimension selection algorithm.

2. Description of the Prior Art

In general, multimedia data such as audio, video, images and text, time-series data indicating a sequence over a period of time, and a large amount of business data used for various data warehouses first go through preprocessing procedures and are then mapped to points on a high dimensional space for search, management and the like, as shown in FIG. 6. The similarity between the mapped data is measured based on the Euclidean distance between data in the high dimensional space. For example, the similarity between two image files is measured based on the distance between two points mapped onto the high dimensional space.

The term 'similarity join' is defined as a method of efficiently retrieving similar data among data sets when high dimensional data are provided as input data from huge multimedia databases, medical databases, scientific databases, time-series databases and the like, and the similarity join is indispensably required in high dimensional data systems such as image and multimedia data systems, time-series data systems and the like.

The similarity join can be modeled as follows.

Assuming that data sets R and S exist in a d-dimensional space and arbitrary elements r and s for the data sets R and S are represented as $r=[r_1, r_2, \ldots r_d]$, $s=[S_1, S_2, \ldots S_d]$, respectively, a similarity join query can be formulated as follows:

$$R \bowtie S = \left\{ (r, s) \,\Big|\, \left(\sum_{i=1}^{d} |r_i - s_i|^p\right)^{1/p} \leq \varepsilon, r \in R, s \in S \right\} \quad (1)$$

where p is a special distance metric, $\varepsilon$ is a cutoff similarity value as a user-defined parameter, and only data pairs of which the spatial distances are smaller than $\varepsilon$ among data pairs consisting of the elements of the data sets R and S are returned as results.

Conventional similarity join methods are well applied to low dimensional data but are very inefficient for the high dimensional data requiring very large dimensions, i.e. 10 or 100, even 1000 dimensions, in view of performance time and system storage requirements.

Typical examples of conventional similarity join methods may include a similarity join method based on the $\varepsilon$-kdB trees ("High dimensional similarity joins" by K. Shim, R. Srikant and R. Agrawal, Proceedings of the 1997 IEEE International Conference on Data Engineering, 1997) and a similarity join method using the $\varepsilon$-grid order ("$\varepsilon$-grid order: An algorithm for the similarity join on massive high dimensional data" by C. Böhm, B. Braunmuller, F. Krebs, and H. -P. Kriegel, Proceedings of the 2001 ACM-SIGMOD Conference, 2001).

In the similarity join method based on the $\varepsilon$-kdB trees, a data space is divided into cells having an area of $\varepsilon$ along one dimension axis and data are stored in the cells, and the $\varepsilon$-kdB trees having multi-dimensional index structures are constructed with respect to respective cells. This method can efficiently reduce the number of joins by limiting the partitioning area for the data division in $\varepsilon$ unit. However, since the $\varepsilon$-kdB tree structures indicating the respective partitions must be held in the system storage, the required system storage is also increased as space dimensions are increased. As a result, the time required for performing the similarity joins also increases proportionally.

In addition, in the algorithm of performing the similarity join using the $\varepsilon$-grid order, the similarity join for the high dimensional data is performed based on special ordering of the data which is obtained by laying grids having a cell length of $\varepsilon$ over the data space and then comparing the grid cells in lexicographical order. This algorithm can provide efficient scaling of very massive data sets even with limited storage contrary to the method using $\varepsilon$-kdB trees. However, there is a disadvantage in that since all points between $p^{-[\varepsilon,\varepsilon,\ldots \varepsilon]}$ and $p^{+[\varepsilon,\varepsilon,\ldots \varepsilon]}$ must be considered in order to search join pairs of p, as shown in FIG. 7, the number of searched grid cells in an interval gets very large as dimensions increase, resulting in an increased performance time.

Meanwhile, although space partitioning methods used in low dimensional space data systems may be applicable to similarity joins in a high dimensional data space, it is not desirable from a practical point of view in that they require space partitioning for all the dimension axes. In other words, since the number of cells that result from partitioning explodes as the number of dimension axes participating in the partitioning increases (for example, if each dimension axis is divided into 10 continuous sub-intervals, the numbers of cells generated for 8, 16, 32 and 64 dimensions are $10^8$, $10^{16}$, $10^{32}$, and $10^{64}$, respectively), it is likely that these numbers are usually larger than the number of points in the original data sets before being partitioned. If the number of cells that result from partitioning gets larger, a data skew phenomenon is excessively generated. Thus, the algorithm itself based on space partitioning becomes inefficient. Herein, the data skew phenomenon means that when high dimensional spaces are divided into cells, the data distribution in the cells is not uniform, as shown in FIG. 8.

Therefore, there is a need for a new similarity join method in which similarity joins for high dimensional data can be efficiently performed within a short period of performance time and massive storage space is not required during performance of the similarity joins.

SUMMARY OF THE INVENTION

A primary object of the present invention is to provide a method of efficiently performing similarity joins for high dimensional data during a relatively short period of time without requiring massive storage space.

Another object of the present invention is to provide a partitioning dimension selection algorithm capable of improving the performance of similarity joins. The partitioning dimension selection algorithm is to select dimensions and the number of the dimensions, which can dynamically and efficiently partition a data space by using distribution values for respective axes of given data sets.

The present invention provides a partition-based high dimensional similarity join method comprising the steps of partitioning a high dimensional data space and performing joins between predetermined data sets. Dimensions for use in partitioning the high dimensional data space and the number of partitioning dimensions are determined in advance before the space partitioning, and the joins are performed when respective cells of the data sets overlap with each other or neighboring each other.

Preferably, the method further comprises the step of counting the number of join computations which can occur in the joins between the respective cells of the data sets.

The dimensions for use in partitioning the high dimensional data space may be determined based on the number of join computations.

Preferably, the number of dimensions for use in partitioning the high dimensional data space $d_p$ is obtained by comparing the size of the data sets and the size of disk blocks in which the data sets are stored, and can be obtained by the following equation:

$$d_p = \frac{\log \frac{\text{Min}(|R|_{block}, |S|_{block})}{\text{BlockSize}}}{\log\lceil 1/\varepsilon \rceil},$$

where $|R|_{block}$ and $|S|_{block}$ are the total numbers of disk blocks in which the data sets R and S are stored, respectively, the BlockSize is the size of the disk blocks, and $\lceil 1/\varepsilon \rceil$ is the number of the cells.

The number of join computations may be obtained by computing the number of entries of the data sets R and S included in the respective cells for respective dimensions and then counting the number of distance computations of joins between the cells for the respective dimensions.

Alternatively, the number of join computations may be obtained by computing the number of entries of the data sets R and S included in sampled cells among the cells for the respective dimensions and then counting the number of distance computations of joins between the cells for the respective dimensions.

BRIEF DESCRIPTION OF THE DRAWINGS

The above and other objects, features and advantages of the present invention will become apparent from the following description of a preferred embodiment given in conjunction with the accompanying drawings, in which:

FIG. 5 shows a partitioning dimension selection algorithm for the data sets R and S;

FIG. 6 shows a concept that high dimensional data go through preprocessing procedures and are then mapped to points on a high dimensional space for search, management and the like;

DETAILED DESCRIPTION OF THE INVENTION

Hereinafter, a preferred embodiment will be described in detail with reference to the accompanying drawings to provide a non-limiting illustrative description of the present invention. However, the embodiments are merely examples of the present invention, and thus, the specific features described below are merely used to more easily describe such embodiments and to provide an overall understanding of the present invention. Accordingly, one skilled in the art will readily recognize that the present invention is not limited to the specific embodiments described below. Furthermore, the descriptions of various configurations and components of the present invention that are known to one skilled in the art are omitted for the sake of clarity and brevity.

Also, the present invention is not required to overcome the disadvantages described above and the other disadvantages, and an illustrative, non-limiting embodiment of the present invention may not overcome any of the disadvantages.

Figure 1:
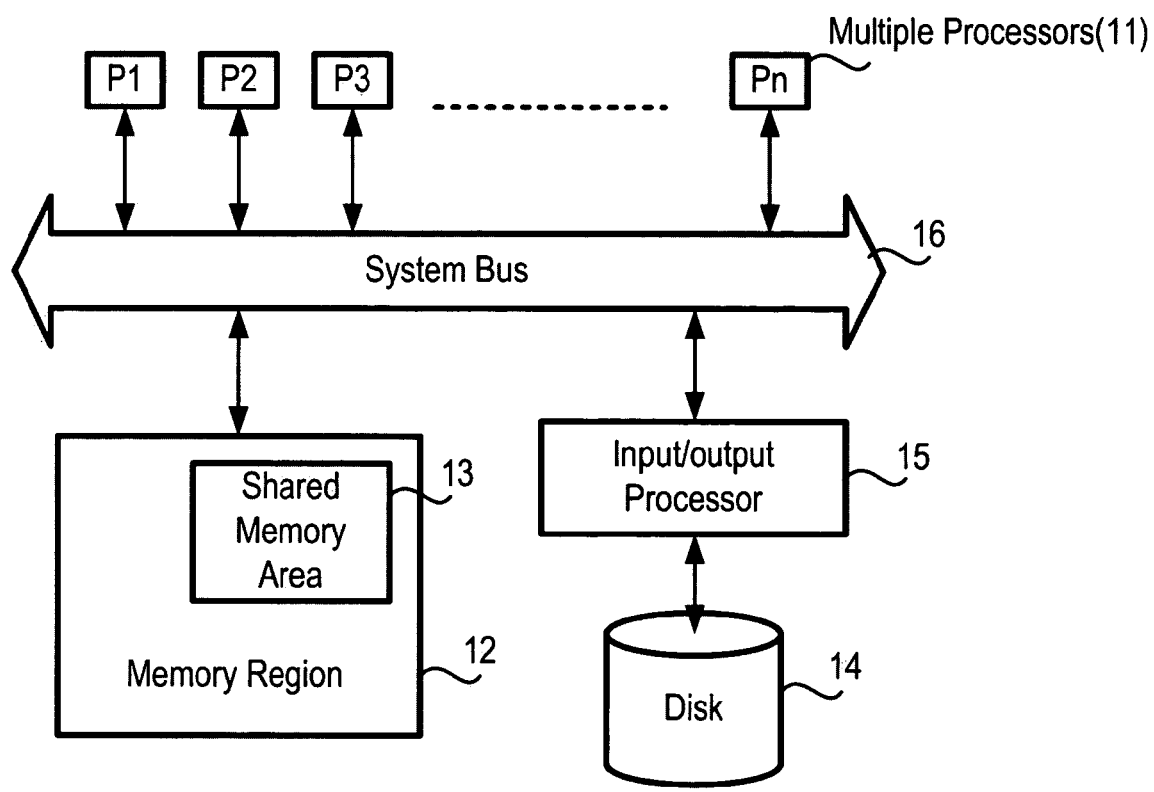
FIG. 1 is a diagram showing a configuration of an example of hardware to which the present invention is applied.

FIG. 1 is a diagram showing a configuration of an example of hardware to which the present invention is applied.

As shown in FIG. 1, single or multiple processors P1, P2, ... Pn 11, a memory region 12 in a main memory device, and an input/output processor 15 are connected via a system bus 16. A shared memory area 13 exists in the memory region 12 of the main memory device, and the input/output processor 15 is connected with a disk 14 as an auxiliary memory device. The present invention can operate under general hardware circumstances including the single or multiple processors and the shared memory area.

Figure 2:
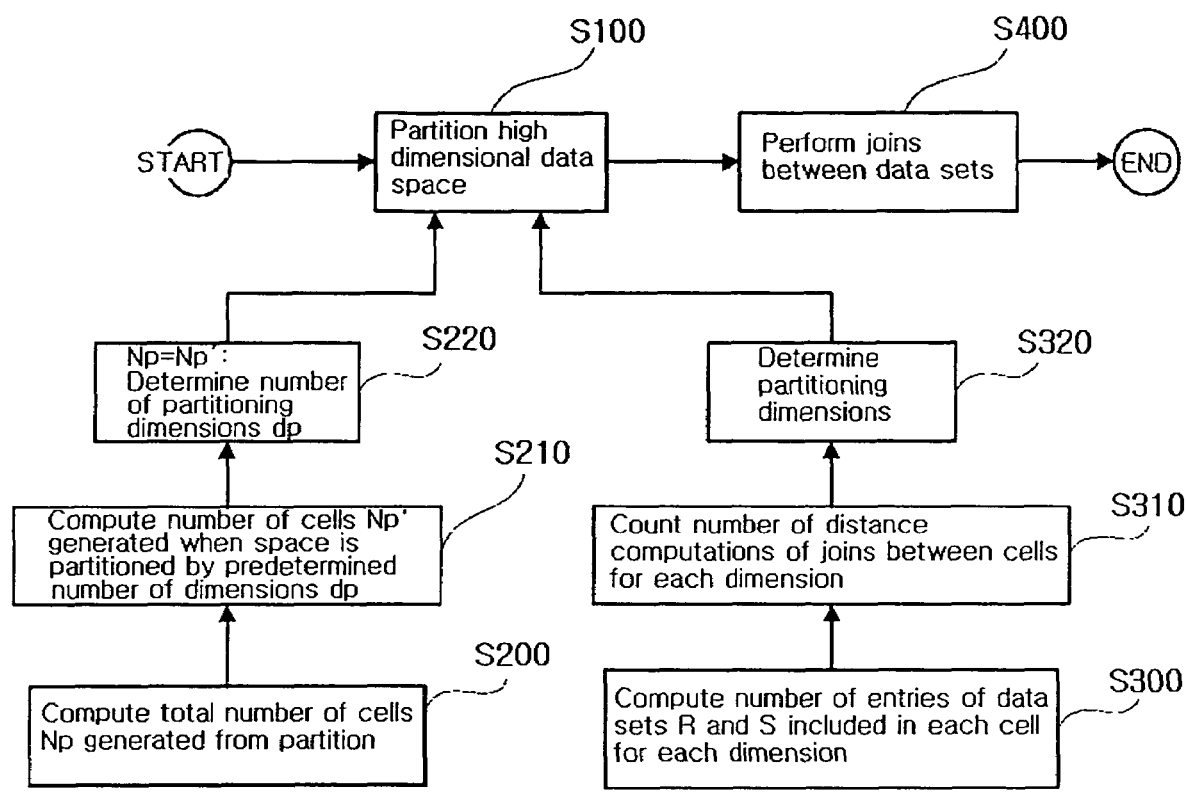
FIG. 2 is a flowchart illustrating a partition-based high dimensional similarity join method according to the present invention.

A partition-based high dimensional similarity join method according to the present invention will be described below with reference to FIG. 2.

The partition-based high dimensional similarity join method according to and embodiment of the present invention comprises the steps of partitioning a high dimensional data space (S100), determining the number of dimensions for use in partitioning the high dimensional data space before the space partitioning (S200 to S220), determining the dimensions for use in partitioning the high dimensional data space (S300 to S320), and performing joins between predetermined data sets (S400).

Each step will be specifically described below.

Figure 3:
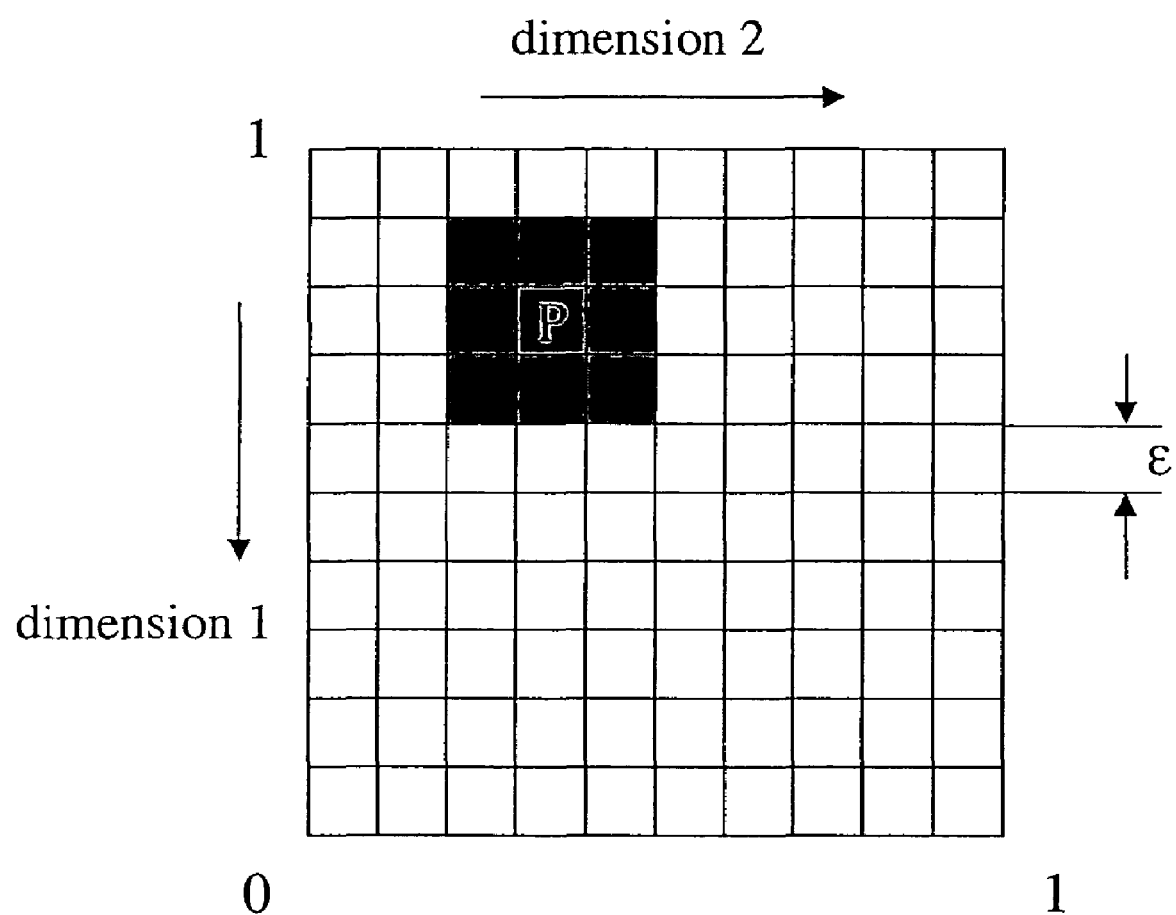
FIG. 3 shows a partitioned data space after a partition step for two dimensions.

In partition step S100, the entire data space is partitioned into cells of a length of $\varepsilon$ indicating a cut-off similarity value. Assuming all entries in the data space are within a unit hypercube, i.e. when each dimension axis ranges between [0,1], each dimension is partitioned into $\lceil 1/\varepsilon \rceil$ cells. Each entry in the data sets R and S, which participate in the similarity join, is assigned and stored in a relevant cell to which it belongs through preprocessing procedures of the data. FIG. 3 shows the partitioned data space after the partition step for two dimensions, wherein small rectangles represent the resulting cells.

In similarity join step S400, data pairs satisfying a special similarity request are searched from two data sets that participate in the similarity join. However, each cell from one of the data sets does not need to be paired with every cell of the other data set, but is paired only with cells which it overlaps or neighbors in the data space. Generally, in a d-dimensional data space, a cell in a data set that is not located at a border of the unit hypercube should be paired with $3^d$ cells in the other set. For example, in the two-dimensional data space shown in FIG. 3, a cell P shall be paired with the 9 shaded cells among cells of the other set for the purpose of the similarity join.

As described above, in case of the high dimensional similarity join, if a data space is divided by employing all the dimensions during the partition step, the number of cells resulting from the partitioning may explode so that the data skew phenomenon can be serious. This consequently causes an increase of disk I/O cost. In addition, if the number of partitioning dimensions increases, the computing cost of hash functions for mapping the data to relevant cells also acts as another source of overhead. Therefore, instead of partitioning the data space by employing all the dimensions, it is desirable to perform the partition of the data space by selecting only several dimensions that have 'uniform distribution' of the data among the dimensions. Herein, the meaning of 'uniform distribution' is understood as a relative concept, i.e. one dimension shows uniform distribution for one data set but does not show uniform distribution for another data set. In addition, as the cut-off similarity value varies, the degree of uniformity of the dimension changes accordingly. That is, the degree of uniformity of the dimension is determined dynamically based on the given two data sets and the cut-off similarity value.

Therefore, the present embodiment does not partition the data space by employing all the dimensions but performs the space partitioning by selecting several dimensions showing 'uniform distribution' of the data from all the dimensions.

Hereinafter, the steps of determining the number of dimensions for use in partitioning the high dimensional data space before the space partitioning (S200 to S220) and determining the dimensions for use in partitioning the high dimensional data space (S300 to S320) according to a preferred embodiment of the invention will be described.

The Number of Partitioning Dimensions

In case of processing a similarity join for the two data sets R and S in the high dimensional space, under the assumption that data points are uniformly distributed in the data space, when the number of partitioning dimensions is $d_p$, the CPU cost [Cost(CPU)], which is computed by counting the number of pairing of data entries of the data sets R and S, can be formulated as follows:

$$Cost(CPU) = |R| \times |S| \times \left(\frac{3}{\lceil 1/\varepsilon \rceil}\right)^{d_p} \quad (2)$$

In addition, the disk I/O cost [Cost(IO)] as the disk access cost can be formulated as follows:

$$Cost(IO) = |R|_{block} + 3^{d_p} |S|_{block} \quad (3)$$

for the total number of disk blocks in which R and S are stored, $|R|_{block}$ for R and $|S|_{block}$ for S.

According to Equations (2) and (3), it is understood that as the number of partitioning dimensions $d_p$ increases, the CPU cost decreases (under an assumption that $\lceil 1/\varepsilon \rceil > 3$), while the disk I/O cost increases. That is, there is a trade-off between the CPU cost and the disk I/O cost in regard to the performance of the similarity join.

In this aspect, the method according to the present embodiment determines the number of partitioning dimensions by comparing the size of the data set with that of the disk block.

Assuming that the average cell size is the same as the size of a disk block, the total number of cells $N_p$ generated after the partition step can be computed as follows (S200):

$$N_p = \frac{Min(|R|_{block}, |S|_{block})}{BlockSize} \quad (4)$$

where $|R|_{block}$ and $|S|_{block}$ are the total numbers of disk blocks in which data sets R and S are stored, respectively, Min( ) is a function that returns a smaller of the values, and BlockSize is the size of the disk blocks.

Further, the number of cells $N_p'$ generated when the space is partitioned into the predetermined number of dimensions can be computed as follows (S210):

$$N_p' = (\lceil 1/\varepsilon \rceil)^{d_p} \quad (5)$$

Therefore, from the equation, $N_p = N_p'$. As a result, the number of partitioning dimensions $d_p$ can be obtained as follows (S220):

$$d_p = \frac{\log \frac{Min(|R|_{block}, |S|_{block})}{BlockSize}}{\log \lceil 1/\varepsilon \rceil} \quad (6)$$

Selection of Partitioning Dimensions

The size of the domain where data can exist in the high dimensional data space grows exponentially (phenomenon known as the 'curse of dimensionality'), and accordingly, actual data existing in the high dimensional data space do not show a uniform distribution.

As described above, since the degree of uniformity of the dimension can be dynamically determined based on the two given data sets and the cut-off similarity value, the partitioning dimensions for the similarity join should be selected with consideration of the associated relationship among the plurality of data sets. As a result, data distribution of one data set is not a criterion of selection of the efficient partitioning dimension for the similarity join processing.

Considering the above aspects, as the criterion of selection of the efficient partitioning dimension for the similarity join processing, the present embodiment uses the number of pairings of the entries of the two data sets when the two data sets are joined to a relevant dimension axis, i.e. the number of distance computations, that is, the number of join computations which are generated in the case of joins between the resulting cells. The number of join computations is regarded as the join cost between cells for each dimension axis, and the partitioning dimension is selected based on the join cost beforehand computed for each dimension axis.

Figure 4A:
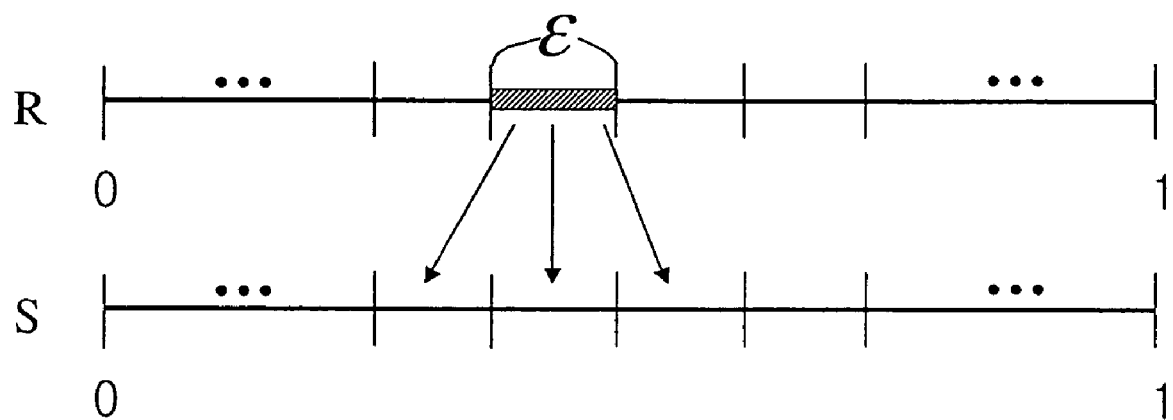
FIGS. 4a and 4b are diagrams explaining a concept of counting the number of distance computations expected for specific data sets R and S.

FIG. 4a is a diagram explaining the concept of counting the number of distance computations expected for the specific data sets R and S.

Each entry in the data sets R and S is mapped to any one among $\lceil 1/\varepsilon \rceil$ cells of the length $\varepsilon$ through space projection on one dimension axis in accordance with its coordinate value of the dimension axis. Then, for each dimension, the number of entries of the data sets R and S, which are included in each cell, is counted (S300).

Thereafter, the number of distance computations that will occur in joins between the cells by using the number of entries is obtained (S310). At this time, a cell in the data set R is paired joined with three cells in the data set S that are neighboring on or overlapping with it. That is, an arbitrary cell in the data set R is paired with the three cells in the data set S, i.e. a cell on the left side of it, one overlapping with it, and one on the right side of it.

Figure 4B:
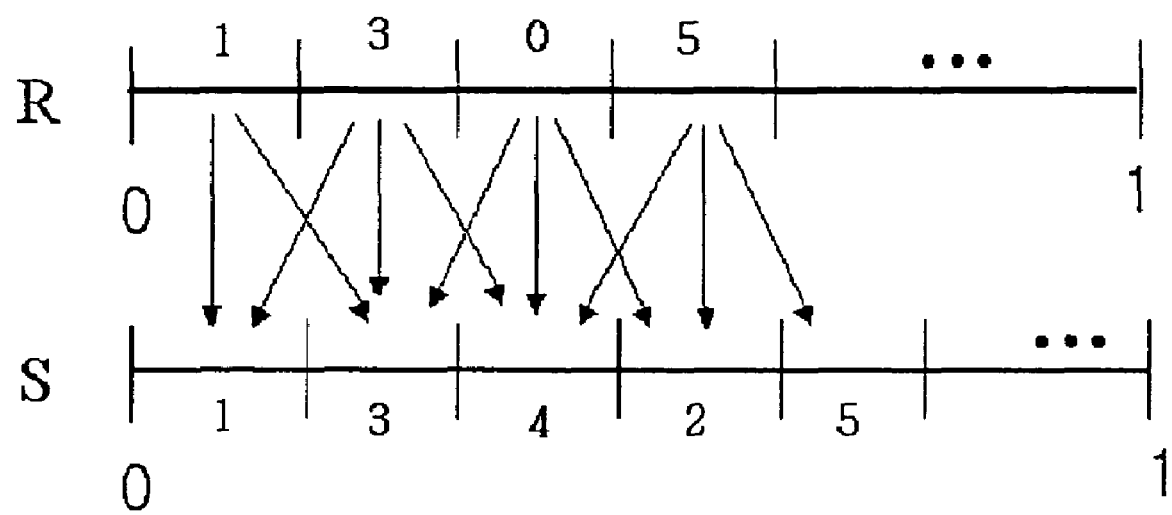
Figure 6:
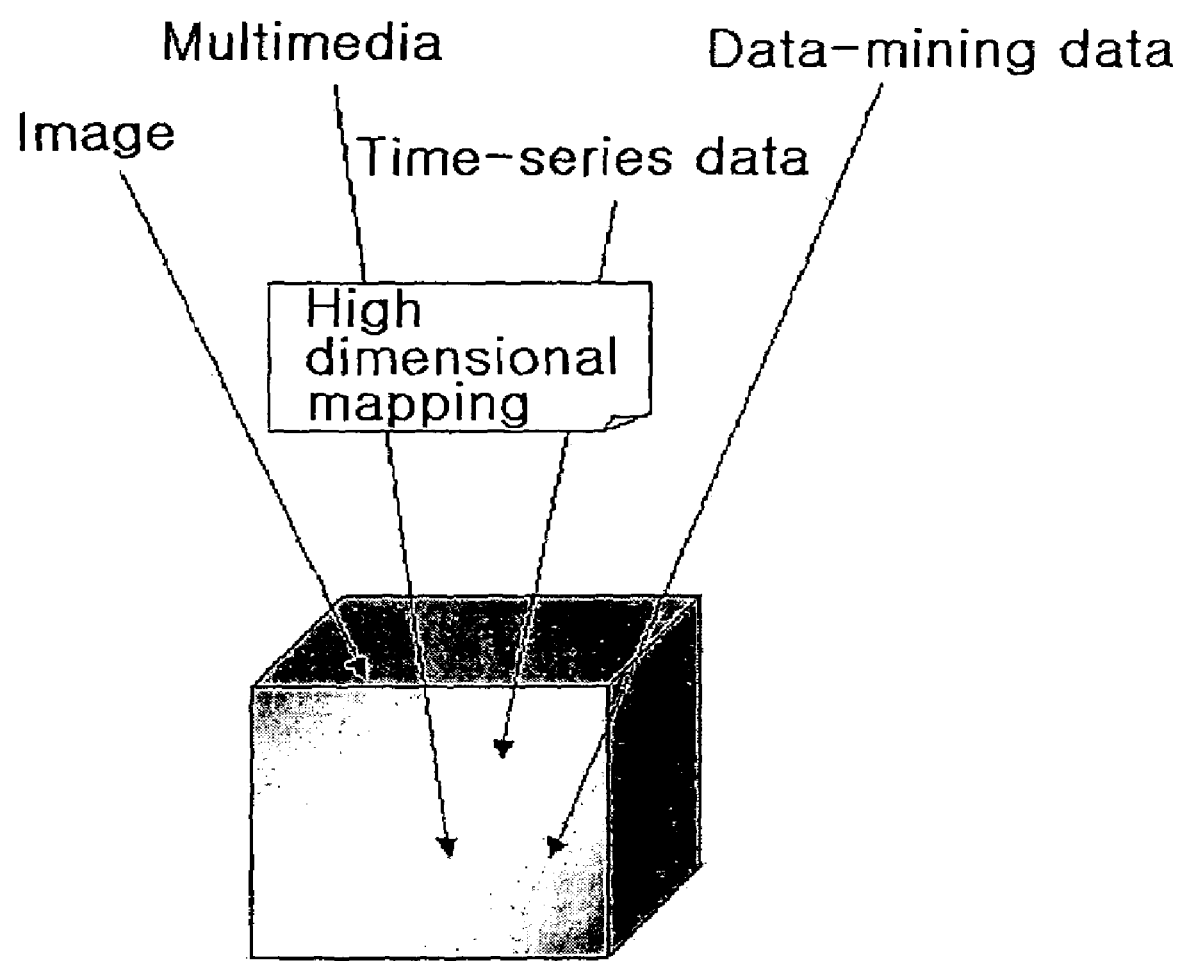
Figure 7:
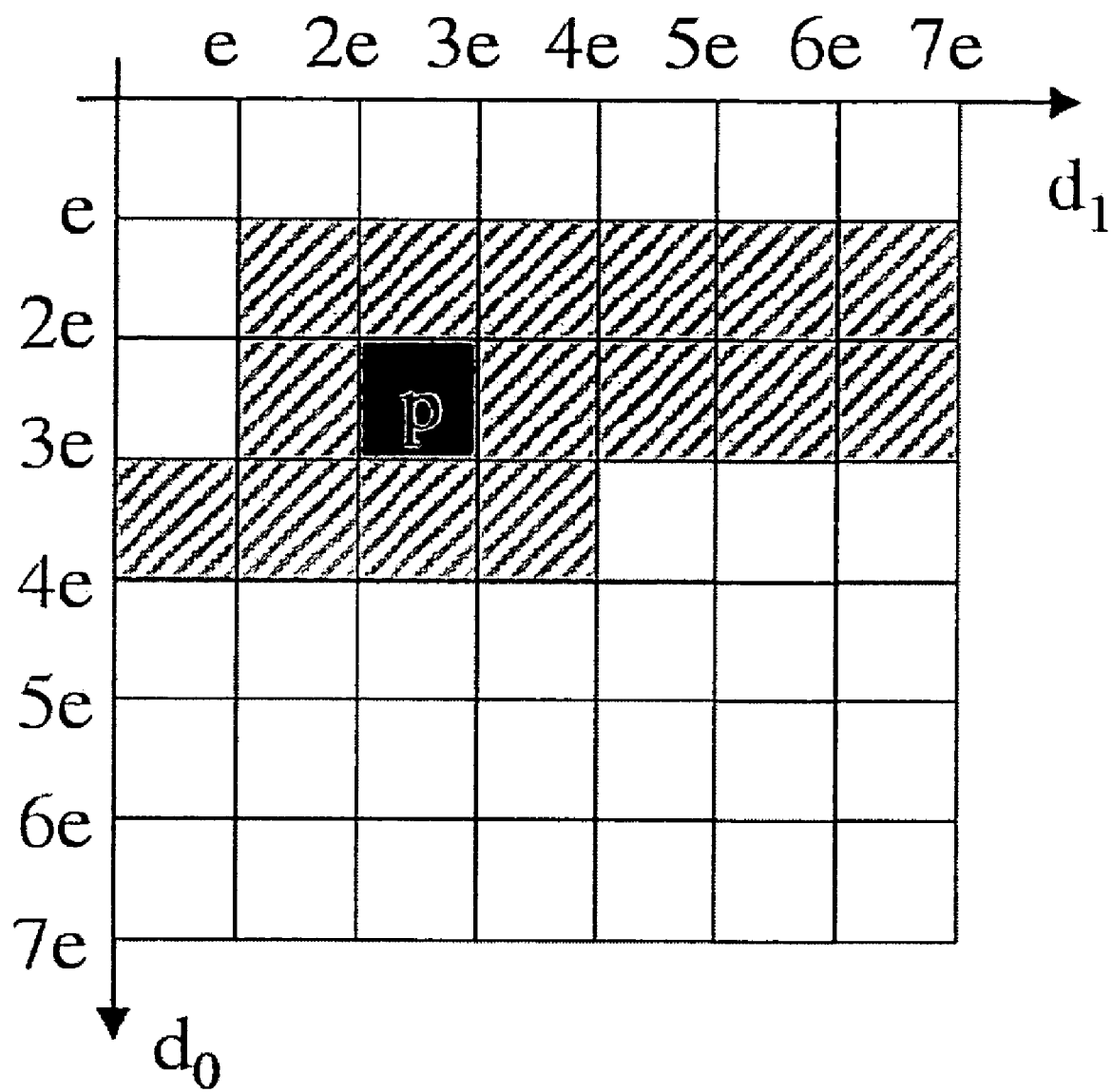
FIG. 7 shows a data space in similarity joins using the conventional $\varepsilon$-grid order.
Figure 8:
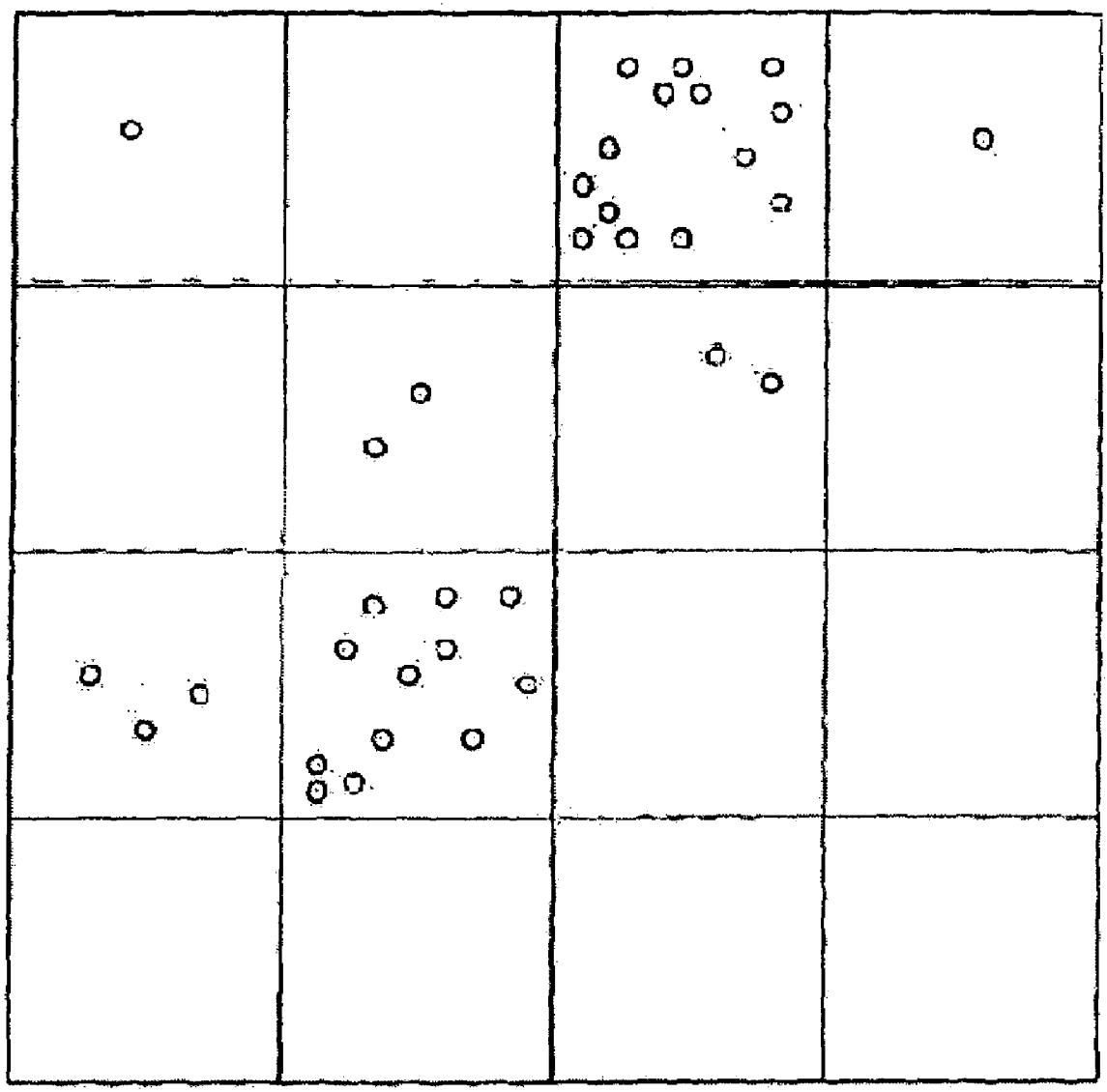
FIG. 8 shows that data distribution in cells is not uniform when the high dimensional space is divided into the cells.

For example, as shown in FIG. 4b, if for a specific dimension, the data set R has 1, 3, 0, 5, . . . entries, respectively, and the data set S has 1, 3, 4, 2, 5, . . . entries, respectively, the number of distance computations is counted as follows:

$$\{(1\times1)+(1\times3)\}+\{(3\times1)+(3\times3)+(3\times4)\}+\{(0\times3)+(0\times4)+(0\times2)\}+\{(5\times4)+(5\times2)+(5\times5)\}+\ldots$$

Finally, it is considered that the smaller the expected number of the distance computations obtained for each dimension axis is, the lower the join cost is, and finally the dimension having the lowest join cost is selected as the partitioning dimension (S320).

Meanwhile, in the case of counting the number of distance computations, it is not necessary to actually partition and store the data, and the counting can be made by recording only the number of data belonging to each cell for the two data sets. That is, upon selection of the partitioning dimension, an actual join computation is not performed, and the number of distance computations required for the join is counted by using only the number of entries assigned to each cell.

In addition, in case of obtaining the number of entries, although the number of entries assigned to each cell for all the data sets may be obtained, it is also possible to obtain the number of entries by sampling a part of the data sets.

FIG. 5 shows a partitioning dimension selection algorithm for the data sets R and S, according to a preferred embodiment of the present invention.

Lines 7 to 11 and 12 to 16 in the algorithm are processes of computing the number of entries of the data sets R and S included in each cell for each dimension, and lines 18 to 24 are processes of counting the number of distance computations of joins between cells for each dimension.

As described above, the present embodiment of the invention allows the space partitioning algorithm, which has been generally used in the low dimensional space, to be applied to the high dimensional data space, so that even if the number of cells resulting from the space partitioning explodes, the similarity join can be performed while optimizing the CPU and I/O costs.

In addition, there is an advantage that according to a preferred embodiment of the invention the performance time of the similarity join can be reduced by selecting the dimensions which dynamically and most efficiently partition the space, and the number of dimensions by using the distribution values for respective axes of the given data sets.

What is claimed is:

1. A partition-based high dimensional similarity join method, comprising:
    determining a total number of dimensions dp for use in partitioning a high dimensional data space and a total number of partitioning dimensions;
    partitioning the high dimensional data space in accordance with the determined dimensions and the total number of partitioning dimensions;
    performing joins between data sets according to the partitioned dimensions; and
    counting a number of join computations which occur in the joins between the respective cells of the data sets,
    wherein the total number of dimensions $d_p$ for use in partitioning the high dimensional data space are determined based on the number of join computations, and
    wherein the total number of dimensions $d_p$ used in partitioning the high dimensional data space is obtained by comparing a size of the data sets and a size of disk blocks in which the data sets are stored, according to the following equation:

$$d_p = \frac{\log\frac{\text{Min}(|R|_{block},|S|_{block})}{BlockSize}}{\log[1/\varepsilon]},$$

where $|R|_{block}$ and $|S|_{block}$ are a total numbers of disk blocks in which the data sets R and S are stored, respectively, the Blocksize is the size of the disk blocks, and $[1/\varepsilon]$ is a number of the cells.

2. The method as claimed in claim 1, wherein the number of join computations is obtained by computing a number of entries of the data sets R and S included in the respective cells for respective dimensions and then counting a number of distance computations of joins between the cells for the respective dimensions.

3. The method as claimed in claim 2, wherein the number of join computations is obtained by computing a number of entries of the data sets R and S included in sampled cells among the cells for the respective dimensions and then counting a number of distance computations of joins between the cells for the respective dimensions.

4. The method of claim 1, wherein the joins are performed only when respective cells in the data sets are overlapping with each other or are neighboring each other.

5. A partition-based high dimensional similarity join method, comprising:
    determining a total number of dimensions $d_p$ for use in partitioning a high dimensional data space and a total number of partitioning dimensions;
    partitioning the high dimensional data space in accordance with the determined dimensions and the total number of partitioning dimensions;
    performing joins between data sets according to the partitioned dimensions; and
    counting a number of join computations which occur in the joins between the respective cells of the data sets,
    wherein the total number of dimensions $d_p$ used in partitioning the high dimensional data space is obtained by comparing a size of the data sets and a size of disk blocks in which the data sets are stored, according to the following equation:

$$d_p = \frac{\log\frac{\text{Min}(|R|_{block},|S|_{block})}{BlockSize}}{\log[1/\varepsilon]},$$

where $|R|_{block}$ and $|S|_{block}$ are a total numbers of disk blocks in which the data sets R and S are stored, respectively, the BlockSize is the size of the disk blocks, and $[1/\varepsilon]$ is a number of the cells.

6. The method as claimed in claim 5, wherein the number of join computations is obtained by computing a number of entries of the data sets R and S included in the respective cells for respective dimensions and then counting a number of distance computations of joins between the cells for the respective dimensions.

7. The method as claimed in claim 5, wherein the number of join computations is obtained by computing a number of entries of the data sets R and S included in sampled cells among the cells for the respective dimensions and then counting a number of distance computations of joins between the cells for the respective dimensions.

8. The method of claim 5, wherein the joins are performed only when respective cells in the data sets are overlapping with each other or are neighboring each other.

* * * * *